June 14, 1960 — E. H. SIELING — 2,940,724
FAUCET
Filed Sept. 16, 1955 — 3 Sheets-Sheet 1
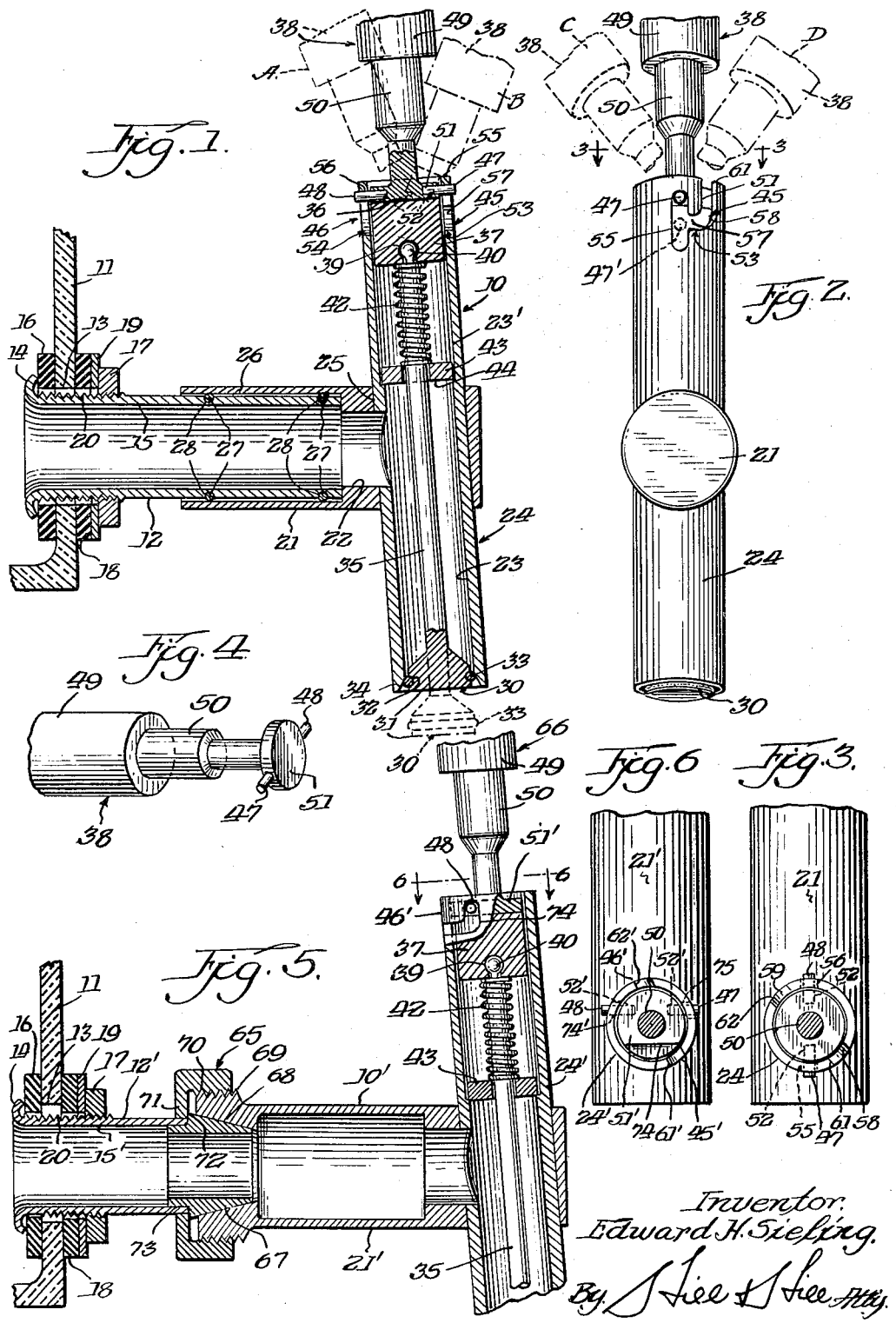

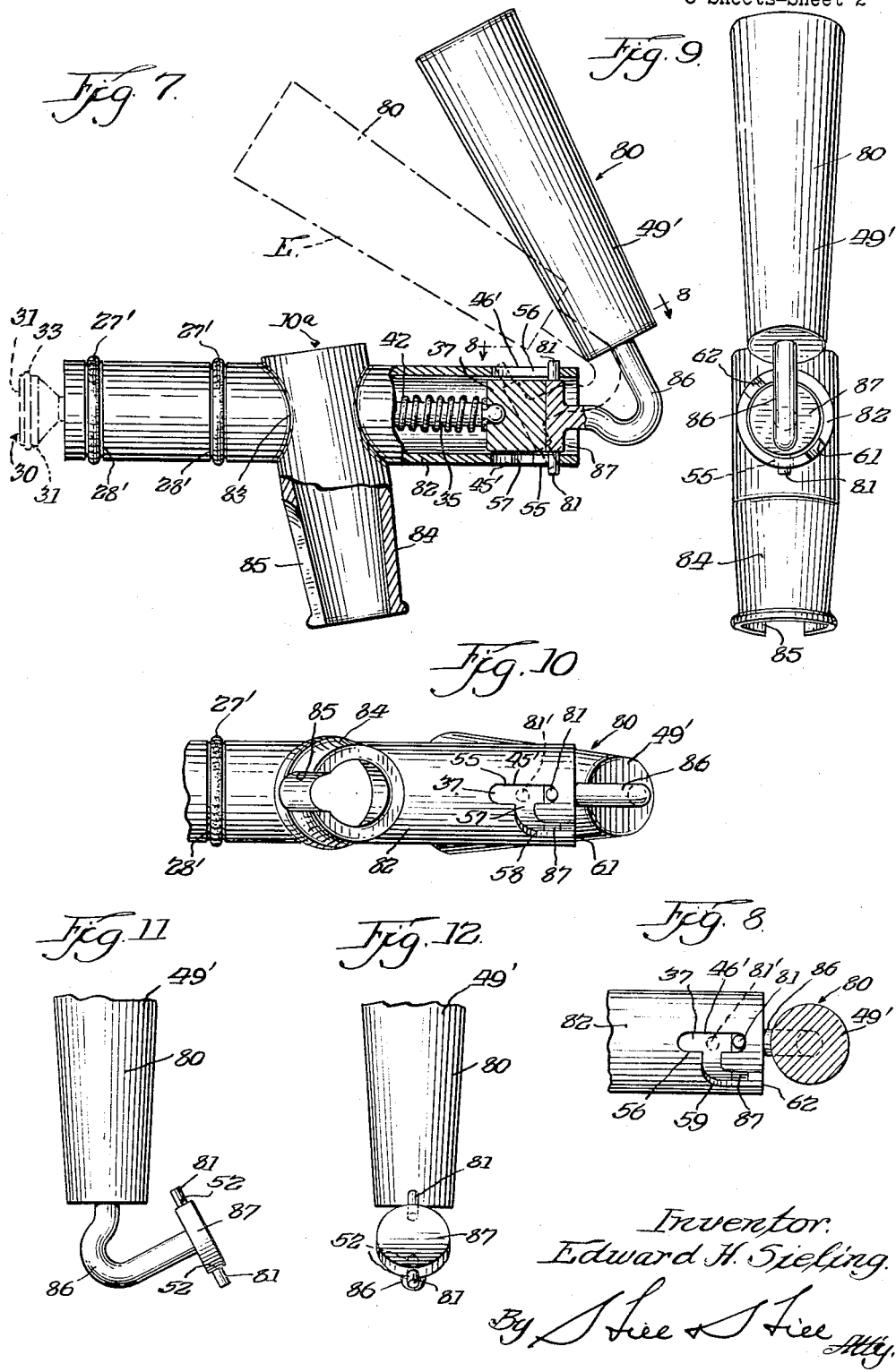

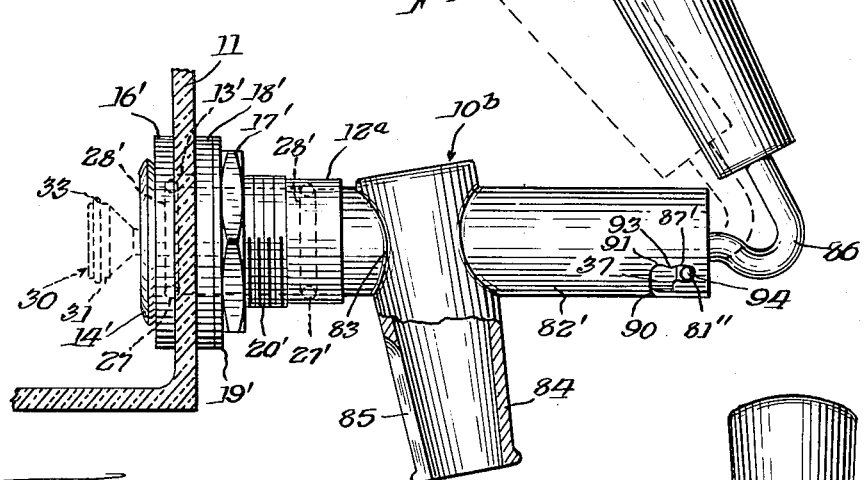
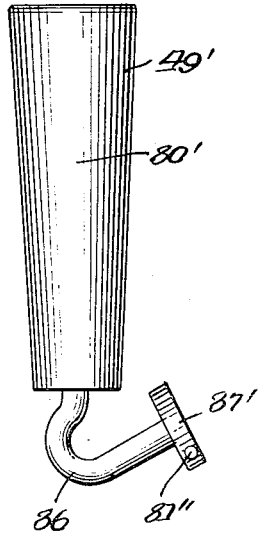
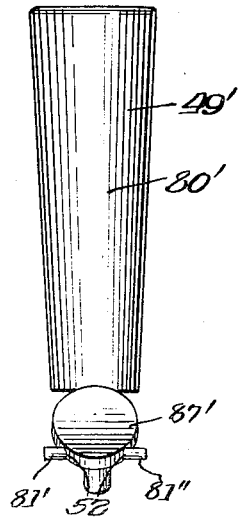
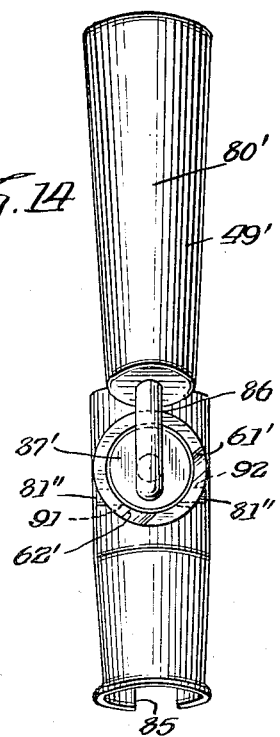

United States Patent Office 2,940,724
Patented June 14, 1960

2,940,724
FAUCET
Edward H. Sieling, 927 W. Huron St., Chicago, Ill.

Filed Sept. 16, 1955, Ser. No. 534,649

5 Claims. (Cl. 251—240)

The present invention relates to a faucet. More particularly, the invention relates to a faucet construction of the type adapted for use on containers of liquids for human consumption, and the embodiments of this invention relate to improvements over my co-pending application, Serial No. 233,509, filed June 21, 1951, for Faucet now U.S. Patent 2,764,385 granted September 25, 1956.

One of the primary problems to be overcome in a design of faucets for use on containers of liquids for human consumption such as a coffee urn, tea dispenser, and the like is that of sanitation. In faucets intended for this purpose, it is absolutely necessary that the faucet construction lend itself to being cleaned with little difficulty because of the fact that personnel generally charged with cleaning such faucets are not inclined to thoroughly wash or cleanse inaccessible or hard-to-clean parts. Consequently, it is essential that the faucet construction be easily assembled and disassembled for cleaning and not include any hard-to-clean portions such as a threaded surface which is exposed to the liquid in the container and wherein accumulation of filth and bacteria might occur. It is also desirable to provide a faucet construction which may be readily manipulated by a handle with a to-and-fro movement and yet which can be readily disassembled to permit the valve construction of the faucet to be readily taken apart and cleaned.

It is therefore an object of the present invention to provide a faucet for use on containers of liquids for human consumption which can be easily and quickly disassembled for cleaning and sterilizing.

Another object of the invention is to provide a novel faucet construction for use on containers for liquids that is adapted to be easily and thoroughly cleaned with a minimum of effort, and which does not have any relatively inaccessible hard-to-clean portions exposed to the liquid in the container on which the faucet is used.

A further object of the invention is to provide a novel faucet construction which is relatively simple and inexpensive to manufacture.

Another object of the invention is to provide a faucet construction which has a readily movable valve construction, a pivoted handle construction for manipulating the valve, and which may be readily detached from the faucet construction.

A feature of the invention is the provision of a faucet construction wherein friction-fitted parts are utilized to hold the faucet in assembled relation to a detachable connection on the container.

Another feature of the invention is the provision of a novel faucet construction wherein resilient O-ring gaskets are utilized to hold the various parts of the faucet in assembled relation.

Still another feature of the invention is the provision of a novel handle construction for biasing the valve construction from closed to open position in which the handle construction is detachably mounted with a bayonet construction complementally formed with respect to the faucet housing for pivotal movement of the handle.

Another feature of the invention is the provision of a handle construction wherein the handle is detachably mounted with a bayonet construction wherein the handle moves angularly about one of the pins of the bayonet construction.

Another feature of the invention is the provision of a handle construction wherein the handle is detachably mounted with a bayonet construction and the handle moves in a plane about an axis at right angles to the plane of the handle.

Another feature of the invention is a faucet construction which has a vertical discharge spout in which the valve construction is detachably mounted and in which the handle for manipulating the valve is mounted at the upper end with a bayonet construction, and is provided with a universal mounting wherein the valve may be opened in any one of four positions of the handle with the handle moving from front to rear, or from left to right from its normal vertical position.

Still another feature of the invention is a faucet construction formed with a vertical discharge spout in which is mounted the detachable valve construction with the valve handle operatively mounted at the upper end of the discharge spout with a bayonet construction, and wherein the valve may be opened by a rearward movement of the handle.

Another feature of the invention is the provision of a faucet construction wherein the valve construction is operatively mounted in the horizontal passage of the faucet construction leading to the spout wherein the handle is detachably mounted from the valve body by a bayonet construction, and the valve is opened by a forward movement of the handle from its vertical position.

Another feature of the invention is the provision of a faucet construction in which the valve therefor is mounted in the horizontal tubular body of the valve construction, and in which the valve is opened by a forward angular movement of the valve handle from its vertical position about the horizontal axis of the bayonet construction for detachably mounting the handle from the valve body.

Other objects, features, and many of the attendant advantages of this invention will be appreciated readily as the same becomes understood by reference to the following detailed description when considered in connection with the accompanying drawings wherein similar parts in each of the several embodiments of the invention are designated by the same reference numeral and wherein:

Fig. 1 is a view in elevation, partly in section, of one embodiment of the faucet construction of this invention illustrating the detachment of the parts of the faucet construction and the bayonet construction for the actuation of the valve and the detachment of the valve assembly;

Fig. 2 is a front view, in elevation, of the valve body and handle construction of the embodiment of Fig. 1;

Fig. 3 is a partial plan view, partly in section, taken along the line 3—3 of Fig. 2, looking in the direction of the arrows, illustrating the bayonet connection for the handle to the valve body;

Fig. 4 is a partial perspective view of the bayonet construction of the handle and cam of the faucet construction of Fig. 1 for actuating the valve mechanism and for detachably connecting the handle to the valve body;

Fig. 5 is a view in elevation, partly in section, of another embodiment of a faucet construction of my invention illustrating another form of bayonet construction for detachably mounting the handle with respect to the valve mechanism and valve body;

Fig. 6 is a partial plan view, taken along the line 6—6 of Fig. 5 and looking in the direction of the arrows, illustrating the bayonet connection for detachably connecting the valve handle to the valve body;

Fig. 7 is a view in vertical elevation, partly in section, of another embodiment of the faucet construction of this invention illustrating an angular handle construction for actuating the valve by a two-and-fro movement and the bayonet construction therefor for detachably mounting the handle;

Fig. 8 is a partial plan view, partly in section, taken along the line 8—8 of Fig. 7 and looking in the direction of the arrows, illustrating the bayonet connection;

Fig. 9 is a front view in elevation of the embodiment of Fig. 7;

Fig. 10 is a bottom view of the embodiment of Fig 7;

Fig. 11 is a partial view in elevation of the handle for the faucet construction of Fig. 7 illustrating the cam and pin constructions of the bayonet connection;

Fig. 12 is a front elevation of the handle construction of Fig. 11;

Fig. 13 is another embodiment of the faucet construction of my invention connected to a container and illustrating an angular handle eccentrically mounted by a bayonet construction to the valve body of the faucet;

Fig. 14 is an end view of the faucet construction of Fig. 13;

Fig. 15 is a view in side elevation of the angular handle of the faucet construction of Fig. 13, illustrating the cam and pins of the bayonet construction; and, Fig. 16 is a front view of the handle construction of Fig. 15.

Referring to Figs. 1 through 4 of the drawings, more particularly a sanitary faucet 10 constructed in accordance with the present invention is illustrated. The faucet 10 is mounted on a container for liquids such as a coffee urn 11 or the like, a part thereof being shown, to which a tubular member 12 is supported in an aperture 13 in one side wall 11. The tubular member 12 has a flanged end portion 14 positioned within the container 11 and an inner passageway 15 communicating with the interior of the container 11. Disposed between the flanged end 14 and the side wall of the container 11 is a flexible annular gasket ring 16, and disposed between the outside surface of the wall of the container 11 and a nut 17 is a second annular gasket ring 18 which, if desired, may have a hardened surface 19 or may be in the form of a separate metal washer. The nut 17 serves to retain the tubular member 12 in place on the container 11, and upon drawing the nut 17 up tightly the flanged end 14 is drawn up firmly against the inner gasket ring 16. The inner gasket ring 16 and the outer gasket ring 18 then serve to sealably enclose the portion of the outer threaded surface 20 of the tubular member 12 complementally formed to threadably receive the nut 17 and prevent liquid from contacting the threaded surface. By this construction, the tubular member 12 can be readily secured to the container 11 without in any manner exposing the threaded surface thereon to the liquid within the container, thereby preventing the accumulation of rot and filth of the threaded surface which is extremely hard to clean and, for that reason, quite often neglected. This construction has been fully disclosed and claimed in my aforementioned co-pending application, Serial No. 233,-509, now U.S. Patent 2,764,385 granted September 25, 1956, and forms no part of this invention except as used in combination with the improved form of faucet construction which is adapted to be attached to and detached from this improved tubular member or container connection 12.

Supported by the tubular member 12 is a body member 21 having a discharge passageway 22 therein communicating with a valved passage 23 of the combined downspout and valve assembly 24 operatively mounted and affixed in an opening 25 extending through the body member 21 so that the axes of the passageways 22 and 23 lie in the same plane. The end portion of the tubular member 12 is complementally formed to the passageway 26 and is adapted to be press fitted within this passageway 26, the press fit being preferably accomplished by means of a plurality of spaced O-ring gaskets 27 axially on the free end of the tubular member 12, and seated in a plurality of longitudinally spaced circumferential grooves 28 formed around the outer surface of the tubular member 12. By reason of the press fit provided for the tubular member 12 within the inner passageway 26 of the faucet body 21, the faucet body 21 can be readily attached to or detached from the container 11, thereby allowing the body member and valve assembly to be easily removed for cleaning and, similarly, the tubular member 12 may be readily removed for cleaning by detaching in the reverse order to which it is assembled. Because of the novel manner in which the tubular member 12 is frictionally supported within the inner passageway 26 of the body member 21, no threaded or other hard-to-clean surfaces are exposed to the action of the liquid within the container, thereby assuring that the faucet will be thoroughly cleaned after disassembly.

Cooperating with the free end of the hollow tubular portion or valved passageway 23 of the combined spout and valve assembly 24 is a movable valve member 30. The movable valve member 30 comprises a cylindrically shaped disk 31 having an annular groove 32 formed around the periphery thereof and a removable O-ring 33 seated in the groove. The O-ring 33 is adapted to engage a tapered or conical surface 34 in the end of the cylindrical downspout 24 and cooperate therewith in a disk-valve fashion. The movable valve member 30 thus comprised is connected by means of a connecting link or stem 35 to a valve operating means 36. The valve operating means comprises a valve stem head portion or plunger 37 secured to the end of the valve stem 35 opposite the movable valve member 30, and slidably seated in the passageway 23 in the combined downspout and valve assembly 24 with the outer end portion thereof outwardly accessible by an operator-operated or handle means 38 to be more particularly described later. In this embodiment of the invention, the plunger 37 is secured to the valve stem 35 by means of a transverse groove 39 complementally formed to a spherical or ball-like end 40 turned from the inner end of the valve stem 35 as shown in Fig. 1. The groove 39 extends diametrically across the head portion 37. Cooperating with the plunger 37 is a compression spring 42 having one of the ends thereof engaging the plunger 37 contiguous to the axis thereof at the point of connection of a spherical end 40 to the transverse groove 39, and the other end thereof engaging a substantially annular sealing gasket 43 seated on an annular shoulder 44 formed by the intersection of a greater diameter passageway 23′ with a lesser diameter portion passageway 23. It is also within the scope of the invention that the compression spring 42 may engage a rigid disk (not shown) which, in turn, abuts the sealing gasket 43 as described with reference to the sealing gasket construction of the aforementioned co-pending application. By this construction, the compression spring 42 serves to normally bias the plunger 37 outwardly, which action results in firmly seating the movable valve member 30 on the valve seat formed by the tapered edge 34 of the hollow tubular member 24.

The movable valve memberm 30 is preferably constructed in such a manner that the outer diameter of the cylindrically shaped disk 31 is less than the cross-sectional dimensions of the inner passageway 23 of the downspout 24′ and the inner passageway 23 so that by removing the O-ring 33, the cylindrically-shaped disk 31 can be withdrawn through the inner passageways 23 and 23′, thereby allowing the faucet assembly thus comprised to be readily disassembled for cleaning. Having removed the cylindrically-shaped disk 31 and the stem 36 from the upper end of the combined downspout and valve assembly 24, the component parts can then be readily disassembled by detaching the plunger 37 of the valve operating means 36 by transversely moving the plunger and spherical end 40 with respect to each other, thus detaching the spherical end 40 from the groove 39. After the plunger 37 is detached from the valve stem 35, the spring 42 and gasket 43 may also be detached. The cleaning of these parts requires little or no concentration since each of these parts present a relatively smooth surface to the individual or person in charge of cleaning the parts. Thus, it is seen that the faucet construction is particularly adapted for use on containers of liquid for human consumption wherein the maintenance of sanitary conditions requires a faucet construction that may be thoroughly cleaned with a minimum of effort and attention. This valve construction is that as similarly described with reference to my co-pending application, Serial No. 406,491, filed January 27, 1954 for thermostatically Controlled Combined Tea and Coffee Maker, now abandoned.

If the faucet is to be used on a container of cool liquids, the construction heretofore described and illustrated in Fig. 1 will suffice though it is necessary to have an additionally long plunger 37 to extend outwardly beyond the upper end of the tubular member 24, as illustrated and described with reference to the first-mentioned co-pending application. However, if the faucet is to be used on a container of hot liquids or even with a container of cool liquids, it is sometimes more desirable to use an additional operator-operated lever or handle means 38 as illustrated, and which in the normal unopened position as illustrated in Fig. 1 stands in axial alignment or substantially vertical according to the inclination of the downspout 24 as in the form of the embodiment in Figs. 1 and 2. It is also preferred to have a handle means which may open the movable valve member 30 as shown in either of the dotted positions A and B of Fig. 1, wherein the valve member 30 may be opened upon angular movement toward the container as shown in position A, or in an angular movement away from the container as shown in position B; and similarly, the valve means 30 may be opened if the handle means 38 is moved angularly to the left as shown in the dotted position C, or angularly to the line as shown in the dotted position D, Fig. 2.

Referring more particularly to Figs. 1, 2, 3, and 4, the improved handle construction for detachably connecting the handle to the upper end of the combined downspout and valve member 24 is arranged to operatively connect the handle means 38 to the plunger 37 for actuating the valve means for opening and closing the valve member 30 by a symmetrically-formed bayonet construction 45 and 46 on the front and rear faces at the upper end of the tubular member 24, the connecting axis thereof either parallel or substantially parallel to the longitudinal axis of the members 12 and 21, and these axes transverse to the longitudinal axis of the valve stem 35 and all the axes lying in the same plane. The axis of the diametrically arranged front and rear pivot pins 47 and 48 is positioned at right angles to the longitudinal axis of the handle means 38 and the longitudinal axis of the valve stem 35.

The handle 38 comprises an insulated handle gripping portion 49 integrally affixed to a metal stem portion 50 having integrally formed therewith a disk-like member 51 to which the pivot pins 47 and 48 are diametrically mounted in complementally formed holes 52, Fig. 1. The thickness of the disk 51 is slightly thicker than the diameter of the pins so that as the pins are pressed in forming a forced fit, there will not be any deformation of the disk. It is also within the scope of the invention that the holes 52 may be drilled diametrically, and a single pin instead of separate pins inserted to form the protruding end as illustrated. The ends of the pivot pins 47 and 48 extend slightly beyond the outer diameter of the tubular member 24. The bayonet connections 45 and 46 preferably comprise the pins 47 and 48 on the disk-like member 51 of the handle, and the symmetrically formed slots 53 and 54 are positioned at opposite ends of a diameter of the combined downspout and valve assembly 24 in alignment with the axis of the tubular member 12 and body member 21. Each of the slots 53 and 54, respectively, comprises an axially extending slot 55 and 56 which permits angular movement of the handle to the respective dotted position A and B as shown in Fig. 1, wherein in the position A, the pin 47 is in the upper end of the slot 55 and the pin 48 is movable downwardly in the slot 56, sufficient clearance being had to give maximum angular movement. In the position B, the pivot pin 48 is in the upper end of the slot 56 and the pin 47 is moved toward the bottom of the slot 55. In this handle movement from the normal axial position of the handle to either position A or B, the edge of the disk-like member 51, for example, contiguous to the pin 48 serves as a cam and actuates the plunger 37 against the bias of the spring 42, opening the valve 30 to the dotted position 30', Fig. 1, upon movement of the handle 38 to the position A. Similarly, the edge of the disk-like member 51 contiguous to the pin 47 biases the valve member 30 to its open position against the action of the spring 42 by the movement of the handle 38 to the position B.

In order to detach the handle 38 from the combined downspout and valve assembly 24, the handle 38 is moved axially downwardly until the pins 47 and 48 are in alignment as shown in the dotted position 47', Fig. 1, of the opening 57, Figs. 1 and 2, of each of the curved slots 58 and 59, the slots 58 and 59 extending upwardly, providing diametrically opposite openings 61 and 62 in the upper peripheral edge of the tubular member 24, Figs. 2 and 3. With the pins 47 and 48 in the dotted position 47', Fig. 2, by a counterclockwise movement, referring to Fig. 2, an upward and outward movement of the pins 47 and 48 through the curved slots 58 and 59 permits the handle to be detached, the pins 47 and 48 being removed through the openings 61 and 62. Upon removal of the handle, the bias of the spring 42 forces the plunger 37 to its outermost position with the movable valve member 30 in the closed position. Also, in this position, the spring 42 biases the sealing gasket 43 against its annular seat 44.

In order to replace the handle, the diametrically positioned pins 47 and 48 are inserted in the openings 61 and 62 and axial pressure is applied downwardly, and as the handle is pushed downwardly it is slightly rotated in a clockwise direction so that the pins pass through the opening 57 into their axially extending slots 55 and 56 taking the dotted position 47'. Upon release of the handle, the spring 42 biases the pins 47 and 48 into their upward position at the upper end of the slots 55 and 56 as illustrated in Figs. 1, 2, and 3. The faucet is then in a position to be operated by movement either forward or backward as in the positions A and B, or sideways to the positions C and D to open the valve.

In the detachment of the valve and its respective parts from the tubular member 24, the handle is moved downwardly axially, forcing the valve to the dotted position 30, Fig. 1, to permit removal of the O-ring 33. The handle is then detached as previously described, and the bias of the spring forces the upper end of the tubular member 24 so that it may be grasped by the finger tips and the entire valve assembly removed, whereupon the plunger 37, spring 42, and sealing gasket 43 may be detached from the valve stem for cleaning and sterilizing. After cleaning and sterilizing the valve body including the part 21 and the part 24, the valve parts are assembled in the reverse order and replaced through the upper end of the tubular member 24. The handle is replaced as described, and upon forcing the handle axially downwardly until the end of the valve member appears below the bottom end, the O-ring 33 may be replaced. After the O-ring has been replaced, the handle is released and the entire valve is ready to be reassembled after the cleaning of the tubular member 21 which also has been detached from the container 11 as described. The body member 21 is forced with an axial and rotary motion over the O-rings 27 of the tubular member 12, whereupon the faucet is assembled in position on the container.

Referring to Figs. 5 and 6, there is illustrated another embodiment of my invention wherein a modified faucet somewhat similar to that of the previous embodiment of Fig. 1 is assembled to the container by a flanged union coupling 65, and the operating handle 66 is so mounted that the valve is only opened by a movement of the handle corresponding to the position B of Fig. 1. Since like reference characters will indicate the same or similar parts, only the changes in the particular parts will be described. The tubular member 12' is modified over the construction of Fig. 1 by a conically-shaped end 67 which may be separately formed as illustrated or integrally formed as a part of the tubular member 12'. The largest diameter of the conically shaped member 67 of the tubular member 12' must be formed to clear the standard opening 13 of the container 11 so that it may be placed in position in the container preferably from the interior of the container, and the flexible annular gasket rings 16 and 18 may be assembled in position together with the metal washer 19 and nut 17. If the annular member 67 is separately formed, it may be brazed in position. The tubular body member 21' corresponding to the member 21 of Fig. 1 is formed with a conical opening 68 complementally formed to receive the conically shaped end 67, and is also threaded as at 69 to receive the complementally formed locking nut 70. The locking nut 70 has an annular flanged portion 71 engaging an annular shoulder 72 of the conically-shaped end 67 to detachably assemble the body member 21 of the faucet to the tubular member 12' which is detachably connected to the container 11. With this construction, the connection of the tubular member 12' is normally permanent, though with suitable modification within the skill of one in the art, the parts may be detachably assembled; for example, the connection of the member 67 to the tubular member 12' may be threaded along the complementally formed connection 73, if desired, rather than affixed by brazing for ease of assembling or disassembling.

The combined downspout and valve assembly 24' is substantially the same as that described with reference to Fig. 1 with the exception, however, that the connection of the handle 66 to the upper end of the tubular member 24' is modified slightly. The operating handle 66 is formed with an insulated hand-gripping member 49 and stem 50 but with a modified disk-like member 51' differing from the disk-like member 51 of Fig. 1 in that a segment of the disk-like member 51' is removed to the cord 74, Fig. 6. The pins 47 and 48 are rotated 90° from the position of the pins of Fig. 3, and are eccentrically mounted in the eccentrically positioned hole 52' drilled parallel to an axis through the stem 50, both axes being at right angles to the longitudinal axis of the body member 21', Fig. 6. In this construction the symmetrical bayonet slot constructions 45' and 46' need not be provided with as long axially extending slots 74' and 75 corresponding to the slots 55 and 56 of the embodiment of Fig. 1. Openings 61' and 62', Fig. 6, are provided for the detachment of the handles 66 as has been described with reference to the embodiment of Fig. 1, the only difference in the operation being that whereas the handle was removed from the slots 55 and 56 with a downward, counterclockwise, and outward movement, the handle 66 of Fig. 2 is removed by a downward, clockwise and outward movement in view of the eccentric positioning of the pins as illustrated in Fig. 6 from the diametrical positioning of the pins as shown in Fig. 3. The handle 66 of the embodiment of Fig. 5 is attached in the reverse order. As the detachment of the valve mechanism of the faucet of Fig. 5 is similar to that of the embodiment of Fig. 1 after the O-ring has been removed, further description of this operation is unnecessary.

Referring to Figs. 7 through 12 and Figs. 13 through 16, there will be disclosed two additional embodiments of my invention wherein improved faucet constructions are had using a bayonet connection which permits detachment of the handle and the valve mechanism of the faucet, and also wherein the pins of the bayonet connection serve as a pivot in the embodiment of Figs. 7 through 12 and pivots in the embodiment of Figs. 13 through 16. Referring to Figs. 7 through 12, the embodiment in which the handle 80 is pivoted about one of the pins 81 may be moved from an inclined vertical position to the dotted position E, Fig. 7. In the dotted position of Fig. 7 the handle is shown pivoted about the lower pin 81 within the symmetrical bayonet constructions 45' and 46' comparable to the bayonet construction of the embodiment of the faucet construction of Figs. 1 and 2. In the embodiment of Fig. 1, the axially extending slots 55 and 56 are mounted in the vertical tubular member or combined cylindrical downspout and valve means 24, whereas in the embodiment of Fig. 7, the handle means 80 is operatively connected to the faucet body member 82 which operatively mounts the valve means similar to the valve means of the embodiment of Fig. 1; but in the embodiment of Fig. 1, the fluid dispensed is discharged through the open end of the combined downspout and valve member 24, and in the embodiment of Fig. 7, the movable valve member 30 opens within the container 11 as illustrated in the dotted construction 30 of Fig. 13. Each of these embodiments of Figs. 7 and 13 is an improvement over the embodiment disclosed and claimed in my copending application, Serial No. 233,509, filed June 26, 1951 for Faucet, now U.S. Patent 2,764,385 granted September 28, 1956. In each of these embodiments of Figs. 7 and 13, the tubular valve members 82 and 82' extend through a bore 83 in a downspout 84. Each of these downspouts of the embodiments of Figs. 7 and 13 is provided with an axially extending slot 85, Figs. 7, 9, and 10 of the embodiment of Figs. 7, 13, and 14 of the embodiment of Fig. 13. This slot prevents the dripping of the liquid after the valve has been shut off and serves the same function as the movable valve member 30 in the embodiment of Fig. 1, which as it seals against the tapered opening 34 prevents dripping of the fluid from the end of the spout.

In each of the embodiments of the faucet constructions 10a and 10b of Figs. 7 and 13, the tubular members 82 and 82' are detachably connected to a tubular member 12a as shown in Fig. 13 for detachably connecting the faucet to the contianer 11. The construction of the tubular member 12a and associated parts is substantially the same as that disclosed in my co-pending application, Serial No. 233,509, filed June 26, 1951, now U.S. Patent 2,764,385 granted September 25, 1956, and differs only from the embodiment of Fig. 1 in that in the embodiment of Fig. 1, the tubular member 12 is interiorly mounted in the body member 21, whereas in the embodiments of Figs. 7 and 13, the tubular members 82 and 82' are slidably mounted within the tubular member 12a. In the embodiment of Figs. 7 and 13, the tubular member 12a is similarly formed with a flanged end portion 14', and is provided with a threaded surface 20' to complementally receive a nut 17' to clamp the annular gasket rings 16' and 18' together with the washer 19' or hardened surface of the washer 18' in fluid-tight relationship about the opening 13' in the container 11'. Axially spaced O-rings 27' are mounted in the annular grooves 28' formed on the periphery of the tubular members 82 and 82', and frictionally retain either the faucets 10a or 10b to their respective tubular connections 12a complementally formed to each of the faucets and affixed to their respective containers 11' to permit the detachment of each of the faucet constructions and each of the connections 12a for proper cleaning and sterilizing. Since the detachment of the modified connection 12a is similar to the connection 12 of Fig. 1, further description is unnecessary. Likewise, as each of the valve mechanisms of the embodiments of Figs. 7 and 13 is substantially identical to the construction described with reference to Fig. 1, further description of the valve parts including the movable valve member 30, its O-ring 33, valve stem 35, compression spring 42, and plunger 37 is unnecessary and therefore like or similar reference characters denote the same parts.

Each of the handle means 80 is similar in construction to the handle means of Figs. 1 and 6 with the exception that the insulated handle gripping member 49' is affixed to a substantially U-shaped stem 86 which permits the handle means 80 to be inclined forwardly toward the container 11' so that the movement is automatic on the part of the operator to open the valve of the faucet by pushing the handle forward rather than to pull it backwards. The forward end of the stem is affixed to or integrally formed with a disk-like member 87 which is similar to the disk-like member 51 of the embodiment of Fig. 1. The disk-like member 87 is formed at right angles to the forward end of the axis of the stem 86, and the angular shape of the stem 86 upon the mounting of the disk-like member 87 at right angles to the longitudinal axis of the faucet body member 82 inclines the handle 80 forwardly. The pins 81 are mounted on the axis of the disk in the same plane as the axis of the U-shaped stem and handle so that the handle is vertically mounted and in the same plane as the axis of the handle and the longitudinal axis of the valve stem 35 as the pins are mounted in the axially extending slots 55 and 56, Figs. 7, 8, 9, and 10. As the slot construction of the bayonet joint is similar to that of the embodiment of Fig. 1, like reference characters will indicate the same or similar parts. Removal of the handle means 80 of the embodiment of Fig. 7 is substantially the same as that of the handle means 38 in that the handle is forced inwardly so that the pins take the dotted position 81' as shown in Figs. 8 and 10, whereupon with a counterclockwise movement looking in the direction of Fig. 9, the handles are rotated and moved outwardly through the curved slots 58 and 59 and are then detached through the openings 61 and 62 in the end of the faucet body member 82. The handle is returned in the reverse order. In order to detach the valve means 30, the O-ring 33 is removed upon the disk 87 being moved axially inwardly so that the valve means extends beyond the inner end of the faucet body member 82 to the dotted position of Fig. 7, after which the handle is detached as described above, and the valve parts may be withdrawn for cleaning and sterilizing as described with reference to the embodiment of Fig. 1. In opening the valve, the handle is moved to the dotted position E as shown with the lower pin 81 serving as the pivot point for the angular movement of the handle so that the upper edge of the disk-like member 87 cams against the upper surface of the plunger 37 opening the valve means against the bias of the spring. Upon releasing the handle, the valve is closed.

Although in the embodiment shown in Figs. 7 through 12, it is desirable to open the faucet by an inward movement of the handle, the construction of the bayonet joint also permits the opening of the valve upon outward movement of the handle in which case the handle pivots about the upper pin 81 in the upper slot 56. It is also within the scope of the invention that the depth of the lower slot 56 may be located corresponding to the dotted position 81', Fig. 10, of the pin in which case the bottom edge of the slot 55 would be at the bottom edge of the opening 57. In this position, an outward pull might slightly open the valve but not sufficient to permit the discharge of the fluid satisfactorily from the container. By modifying the shape of the bottom slot 55, it is possible to so shape the slot that there would be substantially no opening of the valve in the outward movement of the handle though permitting the detachment of the handle through the bayonet connection.

The pins 81, Figs. 11 and 12, may be press fit in complementally formed openings 52, Fig. 12, which extend partially within the disk-like member 87, or the pin 81 may extend through an opening drilled completely across the diameter of the disk-like member.

Referring to the embodiment of Figs. 13 through 16, the faucet construction is substantially identical to that described with reference to Figs. 7 through 12 with the exception that in the embodiment of Fig. 13, the handle is pivoted about the axes of the pins 81" rather than about the upper or lower pin 81, depending on the direction in which the handle is moved for the embodiment of Fig. 7. The handle construction of Fig. 13 with respect to the location of the pins 81" is somewhat similar to the embodiment of Fig. 5, wherein the pins 47 and 48 are mounted eccentrically with respect to a diameter of the disk-like member 51'. A modified bayonet slot construction 90 is had, and the bayonet slot construction is symmetrically arranged on a cord of the tubular member 82' so that upon a slight angular rotation in a counterclockwise direction as viewed in Fig. 14, the pins 81" may be detached through the openings 61' and 62' corresponding to the similar openings 61 and 62 as viewed in Fig. 9. The axially extending slots 91 and 92, Figs. 13 and 14, are formed with a point 93 to locate the pins 81" in the outer portion 94 of each of the slots 91 and 92. Upon angular movement of the handle 80' to the dotted position F, Fig. 13, the handle is rotated on the pins 81", journaled within the outer slotted portion 94 so that the upper edge of the disk 87' engages the plunger 37, moving the plunger inwardly against the bias of the spring 42 so that the valve means 30 opens to the dotted position of Fig. 13, permitting fluid to flow from the downspout 84 of the faucet. Upon release of the handle, the spring biases the valve means to its closed position, shutting off the flow of fluid, and the slotted opening 85 permits air to enter the downspout 84, preventing drip of the fluid when the valve is in its closed position.

Referring to Figs. 15 and 16, the pins 81" are assembled eccentric to a diameter of the disk 87' which is perpendicular to a plane through the longitudinal axis of the handle 80'. The pins 81" may be mounted in openings 52 as described with reference to the embodiment of Figs. 11 and 12, and similarly, if desired, a pin or pins 81" may extend through a drilled hole extending across a cord of the disk. In this embodiment, the location of the bayonet connection is similar to the location of the bayonet connection for the handle in the embodiment described with reference to Figs. 5 and 6. In this embodiment of Fig. 13, it is unnecessary to remove a portion of the disk as described with reference to Fig. 6 to permit actuation of the handle. The handle of this embodiment is removed in the same manner as described with reference to the embodiment of Fig. 7 and, similarly, the parts of the valve mechanism are removed in the same manner for cleaning and sterilizing. The valve means and the handle are replaced in the reverse order.

From the foregoing description, it can be appreciated that there have been disclosed several embodiments of the invention which provide a faucet for use on containers of liquids for human consumption, which is adapted to be easily and quickly assembled for cleaning and sterilizing. The faucet has no relatively inaccessible or hard-to-clean surfaces which are exposed to the action of the liquid so that after disassembly the parts thereof can be readily cleaned without requiring concentrated attention. Further, the various embodiments are relatively simple in design and adapted to be manufactured inexpensively.

It is also evident that there has been disclosed a simple bayonet construction for detachably mounting a handle for a faucet construction on a valve body thereof, which operatively mounts the handle for actuating the valve means of the faucet and yet permits ready disassembly of the handle and assembly thereof for detachably mounting the valve parts of the valve means of the faucet for cleaning, sterilizing, and servicing. It is also obvious that there have been disclosed several arrangements for pivotally mounting a handle, utilizing the bayonet construction of this invention either about one pin of the bayonet construction or about an axis of the pins of the bayonet construction.

Furthermore, there has been disclosed a handle construction wherein the handle may be operated in any one of several directions, either in a to-and-fro movement from the center location of the handle toward and away from the container, or in a to-and-fro movement to the left or right of the faucet. Also, there have been disclosed other arrangements of the handle construction wherein the valve of the faucet may be opened primarily either with a to-and-fro movement from a central position or solely by a movement in one direction.

There have also been disclosed several embodiments of the faucet construction in which the valve means is directly operated in the downspout or in which the valve means is operated in a passage leading to a downspout, and in each of the several embodiments disclosed there has been disclosed a simple construction for attaching and detaching the coupling means for the faucet to the container for cleaning and sterilizing, and, similarly, there has been disclosed a simple frictional joint construction for the disassembly of the faucet to the coupling means as well as a conventional type of coupling using a threaded joint.

There have also been disclosed simple detachable handle constructions incorporating a bayonet construction for quickly attaching and detaching the handles to the valve bodies and for actuating the valve mechanism.

Having thus described my invention, it is obvious that various immaterial modifications may be made in the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. A sanitary faucet for a liquid container provided with an aperture, including a detachable hollow tubular member having an inner passageway, quickly detachable spring-biased valve means axially disposed in a valved passageway of said hollow body member for controlling the flow of liquid therethrough, handle means operatively mounted on the hollow body member for actuating the valve means, complementally formed bayonet means formed on the handle and the hollow body member for detachably mounting the handle and permitting movement of the handle for actuating the spring-biased valve means and permitting detachment of the spring-biased valve means through the end of the hollow body member to which the handle means is operatively connected, said valve means comprising a cylindrically shaped disk operatively mounted contiguous to the end of the hollow body member opposite the handle means, a valve seat formed on the hollow body member contiguous to the cylindrically shaped disk, an O-ring operatively mounted on the cylindrically shaped disk and operatively engaging the valve seat in the closed position of the valve means, said bayonet means including axially extending symmetrically positioned slots permitting axial movement of the handle means whereby upon an inward axial movement of the handle means the cylindrically shaped disk is biased outwardly permitting detachment of the O-ring therefor, and upon detachment of the handle means by the bayonet means operatively connecting the handle and the hollow body member together, the valve means may be axially removed through the outer end of the hollow body member to which the handle means is connected.

2. A sanitary faucet for a liquid container provided with an apertured wall, including a hollow tubular member, valve means disposed in the inner passageway of said tubular member for controlling the flow of liquid therethrough, said valve means comprising a cylindrically shaped disk having a peripheral groove formed around the outer surface thereof, an O-ring gasket removably seated in said groove and cooperating with the sides of said inner passageway for selectively opening and closing the same, handle means operatively mounted at the end of the hollow tubular member opposite to the cylindrically shaped disk, and complementally formed bayonet means formed on the handle means and the outer end of the hollow tubular member permitting detachment of the handle means and the valve means and actuation of the valve means upon angular movement of the handle means.

3. A sanitary faucet for a liquid container provided with an apertured wall, including a hollow tubular member, detachable valve means disposed in the inner passageway of said tubular member for controlling the flow of liquid therethrough, said detachable valve means including a plunger, valve operating means operatively connected to said valve means for selectively opening and closing said valve means and including a disk-like member, said valve operating means including handle means and said disk-like member affixed thereto and complementally formed bayonet means operatively formed on the disk-like member of the handle means and the outer end of the hollow tubular member for detachably mounting the valve means and for detachably mounting the handle means, said bayonet means permitting the handle means to be detached, and in the attached position of the handle means, the valve means is actuated upon angular movement of the handle means with the disk-like member operatively engaging said plunger.

4. As an article of manufacture, an operating means for a sanitary faucet, including a tubular member and handle means mounted on the outer end thereof by means of complementally formed bayonet means, said complementally formed bayonet means including a portion of the bayonet means formed on the outer end of the hollow tubular member, said portion of the bayonet means providing a fulcrum for the pivotal action of the handle means, said handle means comprising a hand gripping portion and a disk-like member with pivot means operatively mounted on the disk-like member and complementally formed to the portion of the bayonet means formed on the outer end of the hollow tubular member providing the pivot for the handle means, said handle means adapted to be detached and attached to the complementally formed portion of the bayonet means of the hollow tubular member, and said handle means adapted to be biased in the assembled position of said handle means by a spring-biased plunger means, whereby said handle means is adapted to be retained in the complemental portion of the bayonet means formed on the outer end of the hollow tubular member.

5. As an article of manufacture, a valve assembly for a sanitary faucet, including a hollow tubular member and having valve means mounted therein for detachment through one end of the hollow tubular member, a handle means detachably and operatively connected to the hollow tubular member by a bayonet means, said bayonet means forming complementary pivot means on the handle means and the hollow tubular member, said bayonet means in the hollow tubular member comprising axially extending symmetrically arranged slots and arcuately and outwardly symmetrically arranged slots permitting attachment and detachment of the handle means by the pivot means thereof through the axially extending slots, said axially extending slots adapted for permitting actuation of the valve means by the pivot means, and upon detachment of the handle means from the outer end of the hollow tubular member, the valve means operatively mounted in the hollow tubular member may be attached and detached through the outer end of the hollow tubular member.

References Cited in the file of this patent

UNITED STATES PATENTS

| | | |
|---|---|---|
| 513,475 | Bergman | Jan. 30, 1894 |
| 650,287 | Wheildon | May 22, 1900 |
| 1,015,614 | Cordley | Jan. 23, 1912 |
| 1,714,486 | Baird | May 28, 1929 |
| 1,718,730 | Brown | June 25, 1929 |
| 2,143,655 | Heller | Jan. 10, 1939 |
| 2,241,840 | Achtziger | May 13, 1941 |
| 2,247,976 | Titus | July 1, 1941 |
| 2,372,081 | Haldane | Mar. 20, 1945 |
| 2,554,747 | Lee | May 29, 1951 |
| 2,660,834 | MacGlashan | Dec. 1, 1953 |

FOREIGN PATENTS

| | | |
|---|---|---|
| 729,485 | Germany | of 1942 |